US011948351B2

United States Patent
Sivaraman et al.

(10) Patent No.: US 11,948,351 B2
(45) Date of Patent: Apr. 2, 2024

(54) SYSTEM AND METHOD FOR OBJECT RECOGNITION USING NEURAL NETWORKS

(71) Applicant: SIGNIFY HOLDING B.V., Eindhoven (NL)

(72) Inventors: Kalpathy Sitaraman Sivaraman, Cambridge, MA (US); Sirisha Rangavajhala, Wakefield, MA (US); Abhishek Murthy, Stoneham, MA (US); Talmai Brandão De Oliveira, North Andover, MA (US); Xiaoke Shen, Cambridge, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 929 days.

(21) Appl. No.: 16/963,042

(22) PCT Filed: Jan. 9, 2019

(86) PCT No.: PCT/EP2019/050417
§ 371 (c)(1),
(2) Date: Jul. 17, 2020

(87) PCT Pub. No.: WO2019/141559
PCT Pub. Date: Jul. 25, 2019

(65) Prior Publication Data
US 2020/0342324 A1      Oct. 29, 2020

Related U.S. Application Data

(60) Provisional application No. 62/618,197, filed on Jan. 17, 2018.

(30) Foreign Application Priority Data

Feb. 5, 2018    (EP) ..................... 18155022

(51) Int. Cl.
*G06V 10/94*    (2022.01)
*G06F 18/214*    (2023.01)
(Continued)

(52) U.S. Cl.
CPC ............ *G06V 10/95* (2022.01); *G06F 18/214* (2023.01); *G06F 18/2413* (2023.01);
(Continued)

(58) Field of Classification Search
CPC .... G06V 10/95; G06V 10/454; G06V 10/764; G06V 10/82; G06V 20/52; G06V 20/44;
(Continued)

(56) References Cited

U.S. PATENT DOCUMENTS 10,832,136 B2 * 11/2020 Kadav .................. G06F 17/153
2015/0120632 A1 * 4/2015 Campos ................ G06N 3/049
706/44

(Continued)

FOREIGN PATENT DOCUMENTS

WO    2019110294 A1    6/2019
WO    2019134802 A1    7/2019

OTHER PUBLICATIONS

Radoslaw M. Cichy, et al., "Deep Neural Networks Predict Hierarchical Spatio-Temporal Cortical Dynamics of Human Visual Object Recognition," URL: https://arxiv.org/abs/1601.02970, Retrieved on Aug. 16, 2021 (15 Pages).
(Continued)

*Primary Examiner* — Siamak Harandi
*Assistant Examiner* — Daniella M. DiGuglielmo

(57) ABSTRACT

A system and method for providing object recognition using artificial neural networks. The method includes capturing a plurality of reference images with a camera associated with an edge node on a communication network. The reference images are received by a centralized server on the commu-
(Continued)

nication network. The reference images are analyzed with a parent neural network of the centralized server to determine a subset of objects identified by the parent neural network in the reference images. One or more filters that are responsive to the subset of objects are selected from the parent neural network. A pruned neural network is created from only the one or more filters. The pruned neural network is deployed to the edge node. Real-time images are captured with the camera of the edge node and objects in the real-time images are identified with the pruned neural network.

14 Claims, 4 Drawing Sheets

(51) Int. Cl.
*G06F 18/2413* (2023.01)
*G06F 18/243* (2023.01)
*G06N 3/045* (2023.01)
*G06N 3/082* (2023.01)
*G06V 10/44* (2022.01)
*G06V 10/764* (2022.01)
*G06V 10/82* (2022.01)
*G06V 20/40* (2022.01)
*G06V 20/52* (2022.01)

(52) U.S. Cl.
CPC ............. *G06N 3/045* (2023.01); *G06N 3/082* (2013.01); *G06V 10/454* (2022.01); *G06V 10/764* (2022.01); *G06V 10/82* (2022.01); *G06V 20/52* (2022.01); *G06F 18/24323* (2023.01); *G06V 20/44* (2022.01)

(58) Field of Classification Search
CPC ............... G06F 18/214; G06F 18/2413; G06F 18/24323; G06N 3/045; G06N 3/082
See application file for complete search history.

(56) References Cited

U.S. PATENT DOCUMENTS

2016/0086029 A1* 3/2016 Dubuque ............... G06V 20/63
382/159
2017/0103267 A1 4/2017 Mishra et al.

OTHER PUBLICATIONS

Gaurav Manek, et al., "Pruning Convolutional Neural Networks for Image Instance Retrieval," Institute for Infocomm Research, Singapore, Peking University, China, MIT, USA 2017 (5 Pages).

Tom Veniat, et al., "Learning Time-Efficient Deep Architectures With Budgeted Super Networks," UPMC Univ. Paris 06, Sorbonne Universities, Paris, France 2017 (11 Pages).

* cited by examiner

SYSTEM AND METHOD FOR OBJECT RECOGNITION USING NEURAL NETWORKS

CROSS-REFERENCE TO PRIOR APPLICATIONS

This application is the U.S. National Phase application under 35 U.S.C. § 371 of International Application No. PCT/EP2019/050417, filed on Jan. 9, 2019, which claims the benefit of U.S. Provisional Application No. 62/618,197, filed on Jan. 17, 2018 and European Patent Application No. 18155022.9, filed on Feb. 5, 2018. These applications are hereby incorporated by reference herein.

FIELD OF THE INVENTION

The present disclosure is directed generally to object recognition systems, more specifically to object recognition systems using artificial neural networks.

BACKGROUND

Object classification or recognition for captured images and video is becoming an increasingly important ability for a variety of intelligent systems. State-of-the-art image and video processing for computer-aided object recognition is implemented using deep learning artificial neural networks (ANNs). Particularly, convolutional neural networks (CNNs) have shown great promise for use in computer-aided object recognition applications.

According to the current state-of-the-art in object classification systems, deep learning models built using convolutional layers (i.e., CNNs) can recognize approximately one thousand or more distinct classes of objects with near perfect accuracy. Despite being excellent at accurately performing the aforementioned techniques, this level of performance requires an immense amount of computing resources to be feasibly achieved. For this reason, CNNs and other neural networks cannot be made scalable to resource-constrained computing devices, such as consumer electronics, without heavily compromising performance (in both speed and accuracy).

Accordingly, there is a continued need in the art for image processing computer systems that can classify objects accurately using less computing resources.

SUMMARY OF THE INVENTION

The present disclosure is directed to inventive systems and methods for enhancing pedestrian safety and/or conducting surveillance via object recognition using pruned neural networks, particularly on resource-constrained edge nodes of communication networks. The pruned neural networks are created by a centralized server of the communication network to be customized for each of the edge nodes on the server. The creation of the pruned neural networks includes identifying a subject of objects (or classes) of a parent neural network and selecting the filters that respond highly to those objects. The subset of objects is determined by analyzing reference images actually captured at each edge node, such that the pruned neural network is customized specifically for each particular edge node. Furthermore, analysis of the reference images occurs by the parent neural network, which is unpruned, fully trained, and comprehensive. Ultimately, this enables a smaller neural network to be built filter-by-filter from the results of the parent neural network.

Since the parent neural network is used to provide the image recognition for objects in the reference images and to enable the selection of filters, there is minimal reduction in accuracy for the pruned neural networks, but a significant gain in inference speed and reduction in computational requirements. By deploying the pruned neural network to each edge node that includes only the subset of objects which are relevant to each specific edge node, low-capacity or resource-constrained computing devices (e.g., consumer electronics) can detect certain relevant objects with very high accuracy at fast speeds with minimal resources.

Generally, in one aspect, a method for recognizing objects using a neural network is provided. The method includes the steps of capturing a plurality of reference images with a camera associated with an edge node on a communication network; receiving the reference images with a centralized server on the communication network; analyzing the reference images with a parent neural network of the centralized server to determine a subset of objects identified by the parent neural network in the reference images; selecting one or more filters in the parent neural network that are responsive to the subset of objects; creating a pruned neural network from the one or more filters that result from the step of selecting; deploying the pruned neural network to the edge node; capturing real-time images with the camera of the edge node; and identifying objects in the real-time images with the pruned neural network.

According to an embodiment, the method is performed for each of a plurality of the edge nodes that are each connected to the communication network. According to an embodiment, the cameras of a first edge node and a second edge node are configured to observe a common geographic area, the method further comprising dividing the subset of objects into a first portion and a second portion such that the pruned neural network of the first edge node is created from those of the filters corresponding to the first portion and the pruned neural network of the second edge node is created from those of the filters corresponding to the second portion.

According to an embodiment, each of the edge nodes comprises a luminaire of a connected lighting system. According to a further embodiment, the connected lighting system includes one or more lamp posts, street lamps, or traffic lights and wherein the method is utilized to enhance pedestrian safety.

According to an embodiment, the parent neural network and the pruned neural network are convolutional neural networks (CNNs). According to an embodiment, the step of selecting includes analyzing a plurality of known training images (68) with the parent neural network. According to an embodiment, selecting one or more filters includes selecting filters that exhibit a maximum response to the known training images. According to an embodiment, wherein the plurality of reference images is formed by one or more videos. According to an embodiment, the analyzing includes creating a frequency map (62) by tallying a number of times each class of object is identified by the parent neural network, and the subset of objects is determined from the frequency map.

Generally, in one aspect, an object recognition system for a communication network having a plurality of edge nodes is provided. The system includes a centralized server for the communication network, the centralized server having: a parent neural network configured to analyze reference images received by the centralized server from each of the edge node to determine a subset of objects in the reference images corresponding to each of the edge nodes; and a pruning application configured to select one or more filters in the parent neural network that are responsive to each subset of objects and to create a pruned neural network for each of the edge nodes from the one or more filters corresponding to each particular edge node.

According to an embodiment, the edge nodes comprise one or more luminaires. According to an embodiment, the one or more luminaires includes one or more lamp posts, street lamps, or traffic lights. According to an embodiment, the system is implemented to enhance pedestrian safety. According to an embodiment, the centralized server includes a memory and a processor and the parent neural network and the pruning application are installed in the memory and executed by the processor.

By "edge node" it is meant a device that is not part of the centralized infrastructure for a network, but is connected to the network and may or may not assist in functionality of the network. Examples of edge nodes include smartphones, laptops, consumer electronics or appliances, intelligent/connected management systems such as for lighting, thermostat, security, or other appliances, cellular- or network-enabled automobiles, etc., or accessories for use therewith.

"Artificial neural networks", "ANNs" or simply "neural networks" as used herein include computer systems that include software and/or hardware components according to any known or discovered paradigm that grants the neural network learning capabilities (progressively improved performance based on the input of known examples), as opposed to software applications that are programmed in a task-specific manner. ANNs are typically arranged as an interconnected group of "neurons" generally simulating the arrangement and manner of operation of the human brain. The "neurons" are arranged in various layers that include filters that respond differently depending on the data inputted to each neuron. Training the ANN can be accomplished by inputting known examples into the ANN, which enables the ANN to adjust the weight of different neurons to correspond more closely to the known examples. In this way, the ANN can accurately process unknown inputs by comparing which known examples the unknown inputs most closely resemble based on the filters that respond.

Convolutional neural networks (CNNs) are one type of ANN that show particular promise when used with the embodiments disclosed herein. A CNN is typically built as a stack of different layers that ultimately transform an input (e.g., an image) into an output (e.g., a classification of the object(s) identified by the CNN in the image). The convolutional layer is the core building block of a CNN and includes a set of learnable filters. When presented with an image, different ones of these filters will activate in response to different patterns in the image, which in turn, correspond to different objects. The basis of decision made in such a neural network is measured by the response of the activated layers, namely, which filters activate. Based on the response of the filters, the classification layer of a CNN typically assigns a score corresponding to a probabilistic likelihood of which class(es) the object(s) in the image belong. The Softmax function is one example of a function that may be used by the classification layer of a CNN, with larger results from this function correlating to an increased likelihood that the object(s) in the image have been properly classified.

One advantageous property of some ANNs, such as CNNs, is their ability to learn the filter weights associated with the perceived representation of an object, which information can be passed on to the higher level layers (closer to the output) of the ANN to refine the ANN's understanding of that object. The ability of the ANN to learn abstract representations of objects can be further improved by adding additional filters and layers. However, adding filters and layers leads to increased computational complexity and a corresponding reduction of performance (e.g., time required to analyze the image and/or accuracy in identifying/classifying the objects). Powerful machines including one or more designated processors, such as graphics processing units (GPUs) are typically used to carry out the processing required by a CNN. The edge nodes of edge-based computing systems are devices that may not include a GPU and/or have a relatively low amount of computing resources, and thus cannot be feasibly used to provide the processing needs of a comprehensive CNN.

In various embodiments disclosed herein, the edge nodes include a connected lighting system having a plurality of light fixtures or luminaires connected together in a communication network. The term "lighting fixture" or "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of object recognition systems having a plurality of edge nodes. More generally, Applicant has recognized and appreciated that it would be beneficial to provide a centralized server having a pruning application for creating a customized pruned neural network for each of the edge nodes based on objects identified in images actually captured by each edge node. A particular goal of utilization of certain embodiments of the present disclosure is to enable accurate and real-time image recognition using neural networks on edge nodes that have limited computing resources.

In view of the foregoing, various embodiments and implementations are directed to systems and methods for enhancing pedestrian safety and/or conducting surveillance via object recognition using pruned neural networks, particularly on resource-constrained edge nodes of communication networks. The pruned neural networks are created by a centralized server of the communication network to be customized for each of the edge nodes on the server. The creation of the pruned neural networks includes identifying a subject of objects (or classes) of a parent neural network and selecting the filters that respond highly to those objects. The subset of objects is determined by analyzing reference images actually captured at each edge node, such that the pruned neural network is customized specifically for each particular edge node. Furthermore, analysis of the reference images occurs by the parent neural network, which is unpruned, fully trained, and comprehensive. Ultimately, this enables a smaller neural network to be built filter-by-filter from the results of the parent neural network.

Since the parent neural network is used to provide the image recognition for objects in the reference images and to enable the selection of filters, there is minimal reduction in accuracy for the pruned neural networks, but a significant gain in inference speed and reduction in computational requirements. By deploying the pruned neural network to each edge node that includes only the subset of objects which are relevant to each specific edge node, low-capacity or resource-constrained computing devices (e.g., consumer electronics) can detect certain relevant objects with very high accuracy at fast speeds with minimal resources.

Figure 1:
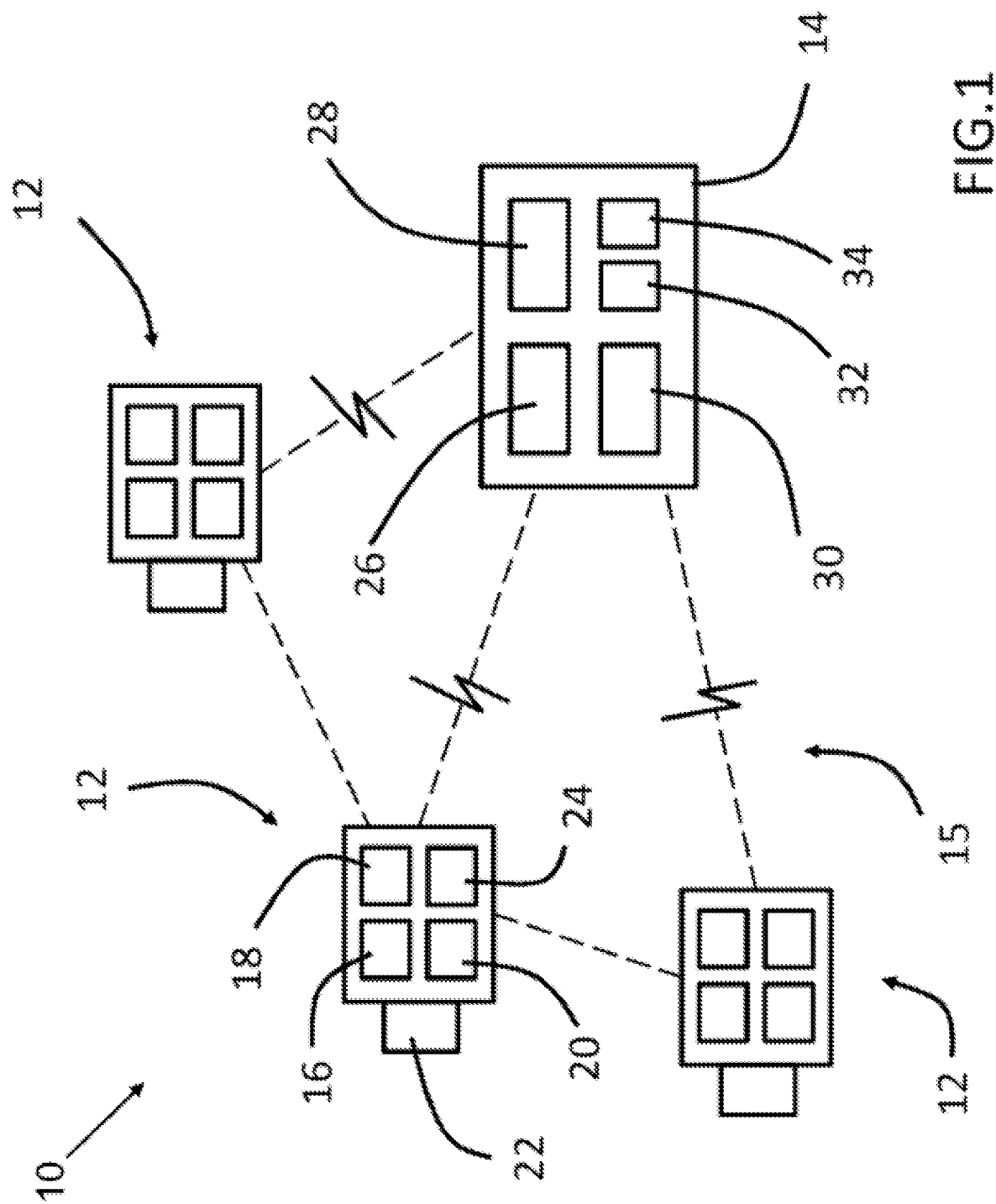
FIG. 1 schematically illustrates an object recognition system according to one embodiment disclosed herein.

Referring to FIG. 1, in one embodiment, an object recognition system 10 is provided with a plurality of edge nodes 12 in communication with a centralized server 14 as part of a communication network 15 (or simply "network 15"), represented by dashed lines. The network 15 may include any desired wired and/or wireless communication technology, protocol, or standard, including those commercially available under the names Bluetooth, Wi-Fi, ZigBee, LTE, etc., or combinations thereof. The edge nodes 12 may either be directly connected to the centralized server 14, or indirectly through one or more other nodes (not illustrated), particularly if the communication network 15 is embodied as a wireless mesh network.

Each of the nodes 12 takes the general form of a computerized device that includes a processor 16, a memory 18, and a network interface 20. The processors 16 may take the form of any electronic circuit, control unit, and/or logic unit configured to carry out operations specified by software instructions communicated to the processors 16. The processors 16 may be, or include, any central processing unit (CPU) or graphics processing unit (GPU) known or developed in the computing industry. The software (e.g., application, program, programming code, etc.) executed by the processor 16, as well as the data resulting from, or used during, operations performed by the processor, may be stored in the memory 18. The network interface 20 may include a transmitter, receiver, radio, or any other hardware or software components required to enable the edge nodes 12 to communicate on the network 15.

While only three edge nodes 12 are illustrated, it is to be understood that any number of the edge nodes 12 may be included. Communication by the edge nodes 12 with the centralized server 14 may be accomplished directly, or indirectly via one or more intermediary nodes (edge nodes or otherwise) that act to forward or relay communication between the edge nodes 12 and the centralized server 14.

Each of the nodes 12 is provided with a camera 22. The cameras 22 can be, or include, any device capable of capturing an image or images, as either still-shots or video. Functionality of each camera 22 may be enabled by the corresponding processor 16 and images stored by the corresponding memory 18. For example, the processors 16 may be arranged to cause their respective cameras 22 to take a picture at regular intervals (e.g., once every minute or other unit of time), in response to a sensed trigger or event (e.g., detection of movement), or in any desired manner.

Each of the edge nodes 12 is also provided with an artificial neural network 24 (interchangeably, "ANN" or simply "neural network"). The neural networks 24 may include software and/or hardware components according to any known or discovered paradigm. In particular, the neural networks applicable to the embodiments disclosed herein are configured to analyze images (e.g., captured by the cameras 22), to detect and classify objects in the images. To this end, the ANN 24 may include software installed on the memory 18 that is executed by the processor 16. In one embodiment, the ANN 24 takes the form of a convolutional neural network (CNN), as CNNs have shown particularly good results when used for image recognition. Examples of suitable CNNs include AlexNet, ImageNet, Microsoft Common Objects in Context (COCO), etc., although others may be used.

In one embodiment the system 10 is, or includes, a connected or "smart" lighting system that includes the nodes 12 as a plurality of luminaries networked together. Since the luminaires of the lighting system are not always actively computing (e.g., the luminaires are generally idle when not receiving or implementing specific instructions), connected lighting systems provide spare computing resources that can be put to use by the ANNs 24. Furthermore, connected lighting systems are advantageously installed or installable in a variety of locations that could benefit from monitoring and/or surveillance, e.g., in a building, a room, a cityscape, a road, a traffic intersection, a park, a field, indoors, outdoors, etc.

In one embodiment, the system 10 is arranged to monitor a location to provide enhanced pedestrian safety. For example, the system 10 could be used to detect the presence of vehicles and/or pedestrians at a location such as a traffic intersection. In such an embodiment, the system 10 could be arranged to detect events such as near-crashes based on the calculated proximity or closeness of the recognized vehicles and/or pedestrians. The system 10 could also identify other dangerous or troublesome situations by recognizing the presence and location of pedestrians, vehicles, or other objects. For example, the system 10 could determine whether vehicles are not stopping at stop signs, whether an intersection would benefit from increased traffic control devices (e.g., traffic lights, stop signs), whether pedestrians are using non-designated areas to cross the street, etc. If such a dangerous or troublesome situation is detected, then the system 10 could be arranged to send a signal (e.g., message or alert) over the network 15 to a designated computer, system, address (e.g., email address), or personnel responsible for traffic safety.

In another embodiment, the system 10 is a self-driving or traffic management system with each of the nodes 12 taking the form of an automobile or an accessory (e.g., dash cam, back up camera, etc.), for an automobile. In one embodiment, the system 10 is arranged for a building, such as a bank, warehouse, government building, etc. and arranged to identify objects or persons indicating intrusions or security threats. In one embodiment, the system 10 is used for monitoring wildlife in a particular environmental habitat. Those of ordinary skill in the art will readily recognize a multitude of other uses for the system 10.

The centralized server 14 is any combination of software and/or hardware that enables the centralized server 14 to provide functionality for the network 15, the edge nodes 12, or other devices or nodes on the network 15. In one embodiment, the centralized server 14 includes a processor 26, a memory 28, and a network interface 30, which generally resemble the processor 16, the memory 18, and the network interface 20, respectively. However, the computing resources of the edge nodes 12 are relatively limited in comparison to those of the centralized server 14. That is, the speed of the processor 16, the data storage size of the memory 18, etc., is/are significantly less than the corresponding components of the centralized server 14. In one embodiment, the centralized server 14 is, or includes, "the cloud" or an array of computers or computing resources available from a cloud-based computing solution. It is thus possible for the centralized server 14 to perform complex computing tasks that are not feasibly able to be executed by the edge nodes 12.

As a result of the relatively limited computing power of the edge nodes 12, and as discussed in more detail below, the ANNs 24 in the disclosed embodiments are each a pruned version of a parent ANN 32 included by the centralized server 14. To this end, the centralized server 14 may include a pruning application 34 that is arranged for commissioning a pruned ANN to each of the edge nodes 12 and the ANNs 24 may be referred to as "pruned". The parent ANN 32 can take any of the forms noted above, such as a CNN, or ANN according to another deep learning model that is capable of detecting and classifying objects in images.

Figure 2:
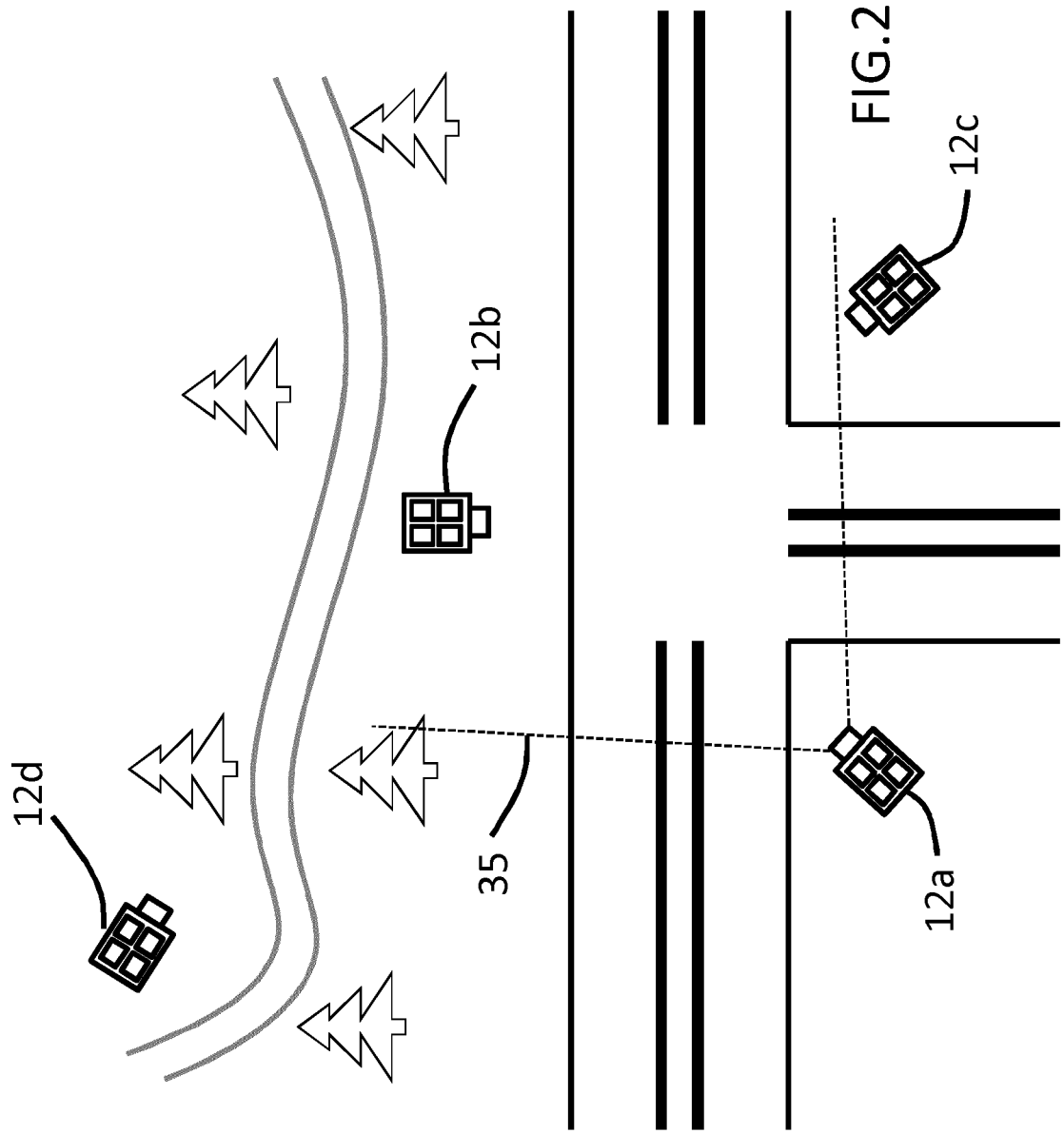
FIG. 2 schematically illustrates an object recognition system arranged in an example scenario according to one embodiment disclosed herein.

It has been recognized in the current embodiments that each of the edge nodes 12 is located in a particular physical location and thus the camera 22 only captures images corresponding to a geographic area associated with a particular one of the edge nodes. For example, FIG. 2 illustrates one example scenario that may benefit from the currently disclosed embodiments, in which the edge nodes 12 are each a luminaire (e.g., street lamp, lamp post, traffic light, etc.) in a connected lighting system. Each of the edge nodes 12 in FIG. 2 is provided with an alphabetic identifier (i.e., 'a', 'b', 'c', 'd') appended to the numeral 12 to facilitate discussion with respect to different ones of the edge nodes 12. The scenario of FIG. 2 includes three of the edge nodes 12 (the edge nodes 12a, 12b, and 12c) arranged to observe an intersection of a road, and one of the edge nodes 12 (the edge node 12d) arranged to observe a walking path through a park.

Each of the cameras 22 corresponding to the edge nodes 12 has a certain field of vision, typically in the form of a cone extending from the camera. A field of vision 35 corresponding to the camera of the edge node 12a is illustrated in FIG. 2. Thus, the field of vision 35 defines a geographic area corresponding to the edge node 12a. Each of the other edge nodes 12 would include a similar field of vision that defines a geographic location corresponding to each respective one of the edge nodes 12. Necessarily, images captured by the camera of each of the edge nodes 12 correspond to the geographic area delineated by the field of vision corresponding to that camera.

It is expected that different edge nodes at different locations will encounter different objects, and that none of the edge nodes will encounter all of the objects on which a comprehensive ANN, e.g., the parent ANN 32, has been trained (e.g., current ANNs can be trained on over one thousand different classes of objects). For example, the edge node 12d (which overlooks a walking path in a park) may see objects typically found in a park, such as a dog, a person, a cyclist, or a ball. In comparison, the edge nodes 12a, which overlook a traffic intersection, may see objects such as a car, a truck, a motorcycle, etc. It is unlikely that any of the edge nodes 12a-12d in the scenario of FIG. 2 would encounter objects corresponding to even a fraction of the total number of classes current ANNs have been trained on, such as various exotic animals (e.g., a stingray, a polar bear, etc.), foods (e.g., a banana, a pineapple, etc.), household objects (e.g., toilet paper, television set, etc.). Since edge nodes may be provided in any location, the objects encountered will vary widely from edge node to edge node. An edge node having a camera located overlooking an arctic landscape might never see a car (just as the edge nodes 12a-12d never see polar bears), but could be useful to help identify and track polar bear populations (just as the edge nodes 12a-12c may be used to track traffic flow).

Figure 3:
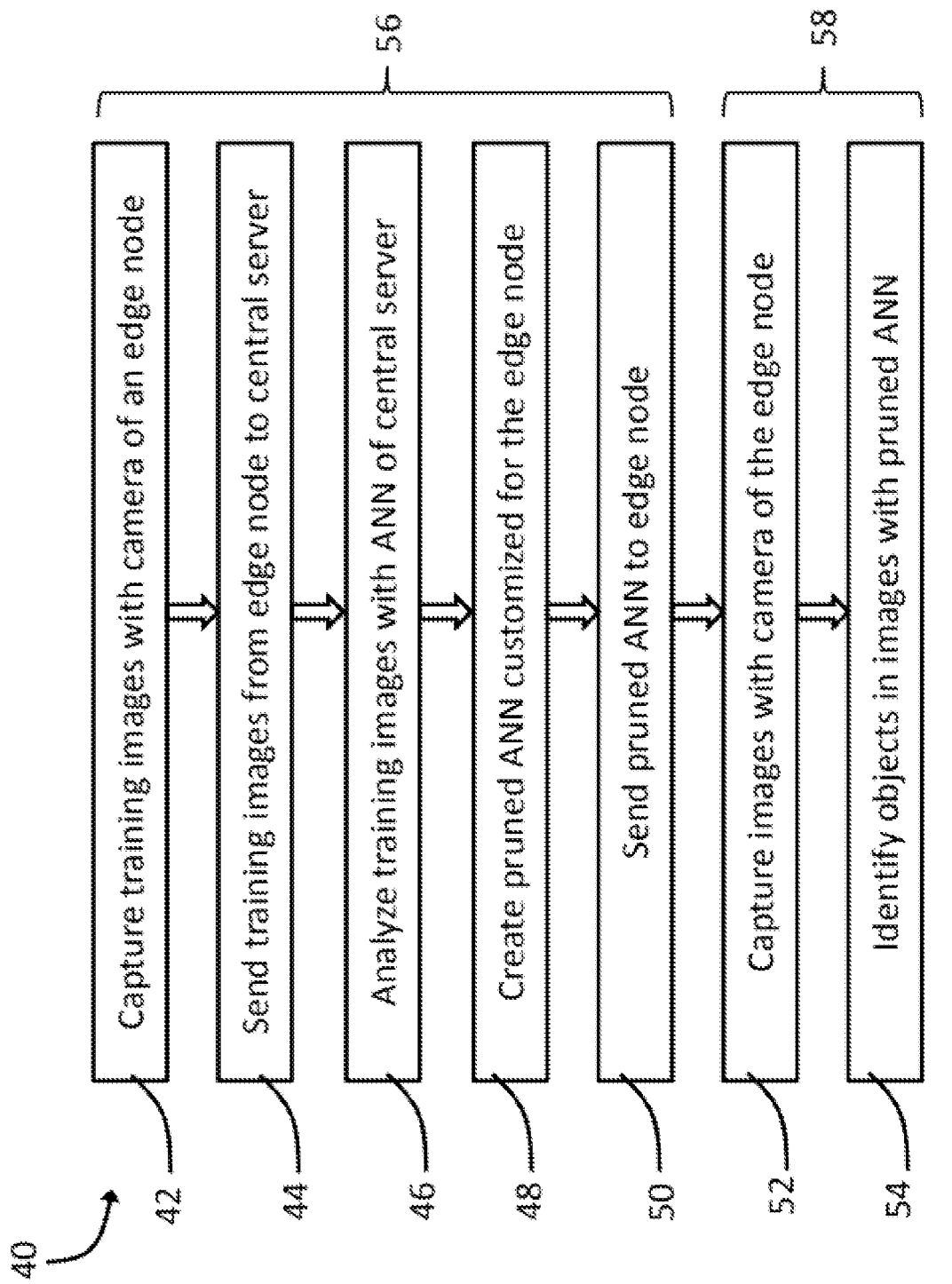
FIG. 3 is a flowchart of a method of training and operating an object recognition system, such as the system of FIG. 1.

A method 40 is provided in FIG. 3 that enables the ANN 24 for each of the edge nodes 12 to be customized for each particular edge node 12 based on the images actually captured at the camera 22 of the corresponding edge node. The customization results in only those filters corresponding to objects actually encountered by each of the edge nodes 12 to be included in the ANN 24 of that edge node. In this way, the method 40 can be considered as a "bottom-up" method of pruning, in that the selected filters are determined based on the objects identified in actual images captured by a camera at each edge node, and the pruned ANNs 24 are built on a filter-by-filter basis using only these filters. This results in each of the ANNs 24 being customizably streamlined to its corresponding edge node 12.

The method 40 begins at a step 42 in which, for each of the relevant edge nodes 12, a plurality of images (which may be referred to herein as reference images), is captured by the camera 22 of the edge node 12. As should be appreciated in view of the above, an important purpose of the reference images is to create a subject of objects actually encountered in the geographic proximity of each of the edge nodes 12. Thus, the reference images should be gathered over a sufficient period of time to gather a representative sample of the different objects in the geographic area corresponding to each of the edge nodes 12. In one embodiment, this occurs over a period of at least a few days.

The reference images are sent to the centralized server 14 at a step 44. The reference images are then analyzed by the parent ANN 32 of the centralized server 14 at a step 46. A pruned copy (i.e., one of the ANNs 24) of the parent ANN 32 is then created at a step 48, based on the identified objects/filters identified in the analysis of the step 46. The pruned ANN 24 is then sent at a step 50 to the edge node 12 that originally captured the reference images. The edge node 12 then captures images in real-time at a step 52, and identifies objects in the images using the pruned ANN at a step 54. By "real-time" it is meant that the images are captured by an edge node and then analyzed by that edge node, as opposed to being captured, sent to another device (such as the centralized server 14) for processing, and then the results communicated back to the edge nodes. The analysis of the images may occur immediately after or contemporaneously with capture of the image, or after a suitable delay (e.g., at a scheduled time of day or when the edge node 12 detects that it has entered an idle status and/or has spare processing capacity available for use).

The steps 42-50 may be referred to or understood as a pruning routine 56, while the steps 52-54 may be referred to or understood as an operating routine 58. In one embodiment, the pruning routine 56 only occurs once, at initial setup of the edge nodes 12, and the operating routine 58 occurs repeatedly and indefinitely thereafter. In one embodiment, the system 10 is configured to run the pruning routine 56 occasionally over time (e.g., once a week, once a month, once a year, etc.) or upon user input (e.g., via a command issued from the centralized server 14) to ensure that the ANNs 24 of the edge nodes 12 remain properly configured (e.g., to benefit from advancements made to the parent ANN 32, to accommodate changes in the geographic area surrounding each of the edge nodes 12, etc.).

Figure 4:
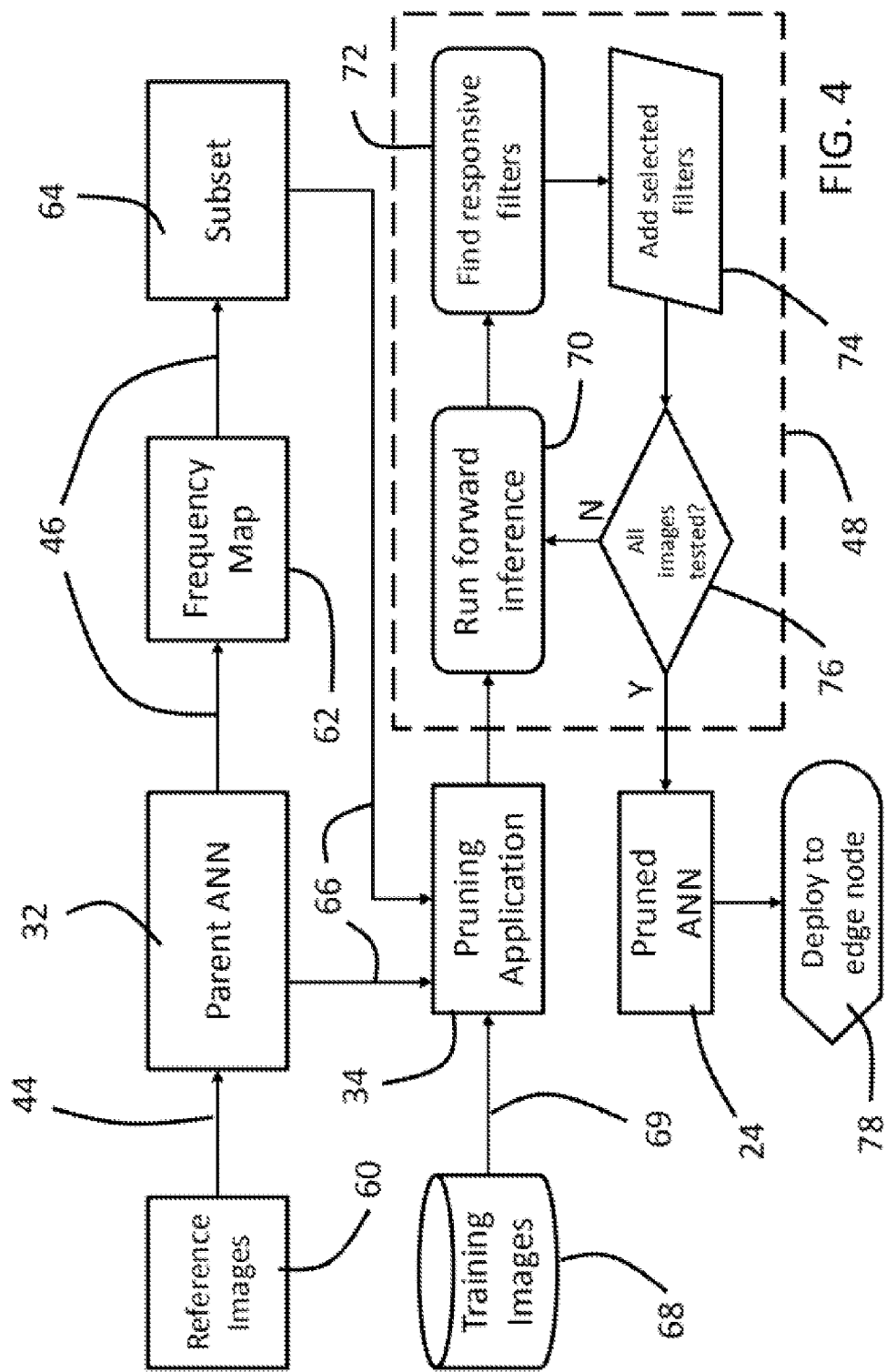
FIG. 4 is a flowchart further describing a pruning routine for creating pruned neural networks according to one embodiment disclosed herein.

FIG. 4 illustrates a flowchart to further describe operation of the system 10 and pruning routine 56 of the method 40 according to one embodiment. Reference images, designated with the reference numeral 60 in FIG. 4, are first provided to the parent ANN 32, e.g., from one of the edge nodes 12 in accordance with the step 44 of the method 40 as discussed above. The parent ANN 32 then analyzes the reference images, e.g., according to the step 46. In addition to storing the inferences made during the analysis, the parent ANN 32 may create, or pass along the information to a frequency map or histogram, designated with the reference numeral 62. The frequency map 62 counts or tallies the number of times each different class of object is identified during the analysis by the parent ANN 32. The frequency map 62 can be used to determine a subset of objects, designated with the reference numeral 64, which were identified in the reference images (and thus, actually seen by the edge node that captured the reference images).

The parent ANN 32 and the subset 64 are then communicated to the pruning application 34 at a step 66. The pruning application 34 may be a software application specifically configured to perform the step 48, e.g., installed in the memory 28 and executed by the processor 26. Additionally, training images 68 may be provided to the pruning application at a step 69. The training images 68 include known or verified examples of each of the objects in the subset 64. For example, if "automobiles" are one of the objects in the subset 64, then the training images 68 would contain known images of automobiles. In one embodiment, the training images 68 have been manually reviewed and tagged by a human as belonging to a particular object classification.

The pruning application 34 performs the step 48 by running the training images 68 through the parent ANN at a step 70. The pruning application 34 at a step 72 identifies the filters that respond to the objects in the training images 68. In one embodiment, only filters that respond sufficiently strongly, e.g., with a maximum response, are selected. The identified filters are compiled into a list at a step 74. At a step 76 the process repeats for each object in the subset 64. Once reference images corresponding to all objects have been processed at the step 76, and their corresponding filters identified, the step 48 is completed and the pruned ANN 24 is created by building the pruned ANN 24 using only those filters identified in the step 74. The pruned ANN 24 is then deployed at a step 78 by sending the pruned ANN 24 to the corresponding one of the edge nodes 12 that captured the reference images 60. This process is repeated separately for each of the edge nodes 12 to customize the pruned ANNs 24 for each of the edge nodes 12.

The ANNs 24, as customized pruned ANN built from only the identified filters of the parent ANN 32, enable the relatively resource-limited edge nodes 12 to timely and feasibly use the ANNs 24 to make inferences on the objects identified in the images captured by the camera 22 of the edge node 12. Referring back to the scenario of FIG. 2, it should be appreciated that the ANNs of the edge nodes 12a, 12b, and 12c should be similar, if not identical, since each of these edge nodes is observing essentially the same geographic area. However, the edge node 12d is not observing a traffic intersection, and thus, its pruned ANN may not resemble the pruned ANNs of the edge nodes 12a, 12b, and 12c. Advantageously, the ANNs for each and every edge node 12 is thus customized to enable the maximum computation speed of each edge nodes 12 without sacrificing accuracy of the ANNs 24.

Also referring back to FIG. 2, a further embodiment can be appreciated with respect to the edge nodes 12a, 12b, and 12c. That is, these nodes each observe a similar area, namely, the illustrated traffic intersection. The subset of objects (e.g., the subset 64) corresponding to each of the edge nodes 12a, 12b, and 12c is expected to be similar (since all are observing the same area) and can thus be further divided such that each of the edge nodes 12a, 12b, and 12c is only responsible for a portion of the subset of objects. For example, if the subset of objects corresponding to the nodes 12a, 12b, and 12c included "automobiles", "pedestrians", and "motorcycles", the ANN of the edge node 12a could be built to include only the filters corresponding to "automobiles" portion, while the ANN of the edge node 12b includes only the "pedestrians" filters, and the ANN of the edge node 12c is built including only the filters responding to "motorcycles". Since the edge nodes 12 are part of a communication network, e.g., the network 15, the edge nodes 12a, 12b, and 12c can communicate the results of their respective analyses with each other.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of object recognition, comprising the steps of:
   capturing a plurality of reference images with a camera associated with an edge node on a communication network;
   receiving the reference images with a centralized server on the communication network;
   analyzing the reference images with a parent neural network of the centralized server to determine a subset of objects identified by the parent neural network in the reference images;
   selecting one or more filters in the parent neural network that are responsive to the subset of objects, the one or more filters being configured to activate in response to patterns in the reference images;
   creating a pruned neural network from the one or more filters that result from the step of selecting;
   deploying the pruned neural network to the edge node;
   capturing real-time images with the camera of the edge node; and
   identifying objects in the real-time images with the pruned neural network.

2. The method of claim 1, wherein the edge node comprises a plurality of edge nodes, the method is performed for each edge node of the plurality of edge nodes that are each connected to the communication network, and each edge node of the plurality of edge nodes has a corresponding camera of a plurality of cameras.

3. The method of claim 2, wherein a first camera of the plurality of cameras corresponds to a first edge node of the plurality of edge nodes, a second camera of the plurality of cameras corresponds to a second edge node of the plurality of edge nodes, and the first and second cameras are configured to observe a common geographic area, the method further comprising dividing the subset of objects into a first portion and a second portion such that the pruned neural network of the first edge node is created from those of the filters corresponding to the first portion and the pruned neural network of the second edge node is created from those of the filters corresponding to the second portion.

4. The method of claim 2, wherein each of the plurality of edge nodes comprises a luminaire of a connected lighting system.

5. The method of claim 4, wherein the connected lighting system includes one or more lamp posts, street lamps, or traffic lights and wherein the method is utilized to enhance pedestrian safety.

6. The method of claim 1, wherein the parent neural network and the pruned neural network are convolutional neural networks (CNNs).

7. The method of claim 1, wherein the step of selecting includes analyzing a plurality of known training images with the parent neural network.

8. The method of claim 1, wherein the plurality of reference images are formed by one or more videos.

9. The method of claim 1, wherein the analyzing includes creating a frequency map by tallying a number of times each class of object is identified by the parent neural network, and the subset of objects is determined from the frequency map.

10. An object recognition system for a communication network having a plurality of edge nodes, comprising:
    a centralized server for the communication network, the centralized server having:
      a parent neural network configured to analyze reference images received by the centralized server from each of the edge node to determine a subset of objects in the reference images corresponding to each of the edge nodes; and
      a pruning application configured to select one or more filters in the parent neural network, the one or more filters being configured to activate in response to patterns in the reference images, and being responsive to each subset of objects, the pruning application being further configured to create a pruned neural network for each of the edge nodes from the one or more filters corresponding to each particular edge node.

11. The system of claim 10, wherein the edge nodes comprise one or more luminaires.

12. The system of claim 11, wherein the one or more luminaires includes one or more lamp posts, street lamps, or traffic lights.

13. The system of claim 12, wherein the system is implemented to enhance pedestrian safety.

14. The system of claim 10, wherein the centralized server includes a memory and a processor and the parent neural network and the pruning application are installed in the memory and executed by the processor.

* * * * *